(12) United States Patent
Maravilla et al.

(10) Patent No.: US 8,345,412 B2
(45) Date of Patent: Jan. 1, 2013

(54) WRIST BAND FOR PORTABLE ELECTRONIC DEVICES

(75) Inventors: Daniel J. Maravilla, Simi Valley, CA (US); Anthony T. Valladares, Thousand Oaks, CA (US)

(73) Assignee: Hex Holdings, LLC, Oxnard, CA (US)

( * ) Notice: Subject to any disclaimer, the term of this patent is extended or adjusted under 35 U.S.C. 154(b) by 234 days.

(21) Appl. No.: 12/945,802

(22) Filed: Nov. 12, 2010

(65) Prior Publication Data

US 2012/0081852 A1 Apr. 5, 2012

Related U.S. Application Data

(60) Provisional application No. 61/404,333, filed on Oct. 1, 2010.

(51) Int. Cl.
*G06F 1/16* (2006.01)

(52) U.S. Cl. ......... 361/679.03; 361/679.01; 361/679.02; 224/219; 368/282

(58) Field of Classification Search ................ 361/679.3
See application file for complete search history.

(56) References Cited

U.S. PATENT DOCUMENTS

| | | | | |
|---|---|---|---|---|
| 4,136,805 A * | 1/1979 | Storms | ......................... | 224/219 |
| 5,008,864 A * | 4/1991 | Yoshitake | ...................... | 368/10 |
| 5,274,613 A * | 12/1993 | Seager | ........................... | 368/13 |
| 6,158,884 A * | 12/2000 | Lebby et al. | ................. | 368/282 |
| 6,459,890 B1 * | 10/2002 | Kim | .............................. | 455/351 |
| 7,764,488 B2 * | 7/2010 | Calvarese | ................ | 361/679.03 |
| 7,793,361 B2 * | 9/2010 | Ishihara et al. | ................... | 2/170 |
| 8,056,780 B1 * | 11/2011 | Bruns | ......................... | 224/163 |
| 2007/0042821 A1 * | 2/2007 | Lee et al. | ................... | 455/575.6 |
| 2007/0194066 A1 * | 8/2007 | Ishihara et al. | .............. | 224/164 |
| 2007/0246494 A1 * | 10/2007 | Kim et al. | ..................... | 224/219 |
| 2008/0074958 A1 * | 3/2008 | Moran | .......................... | 368/282 |
| 2009/0069045 A1 * | 3/2009 | Cheng | ........................ | 455/556.1 |
| 2009/0280861 A1 * | 11/2009 | Khan | ......................... | 455/556.1 |
| 2011/0032105 A1 * | 2/2011 | Hoffman et al. | ........... | 340/573.1 |
| 2012/0051015 A1 * | 3/2012 | Dabov et al. | .................. | 361/760 |
| 2012/0069719 A1 * | 3/2012 | Gutierrez Carranza et al. | ............................ | 368/282 |

\* cited by examiner

*Primary Examiner* — Anthony Q Edwards
(74) *Attorney, Agent, or Firm* — Christie, Parker & Hale, LLP

(57) ABSTRACT

A wrist band for holding a portable electronic device, namely an Apple® iPod® Nano™ device, having a display screen and control buttons. The wrist band includes a band portion for engaging with a user's wrist, and a case portion formed of soft and pliable material with a cavity sized to receive and retain the electronic device, a perimeter rim with button controllers that are aligned with the control buttons of the electronic device, and a retainer to retain the electronic device in place in the cavity. The case portion includes an earphone jack aperture and a jack clip which is detachably attachable with the earphone jack aperture, and which jack clip is adapted to be inserted into the earphone jack aperture and block a jack plug of the portable electronic device when in a first position, and which is adapted to be removed from the earphone jack aperture and the jack plug of the portable electronic device when in a second position.

21 Claims, 11 Drawing Sheets

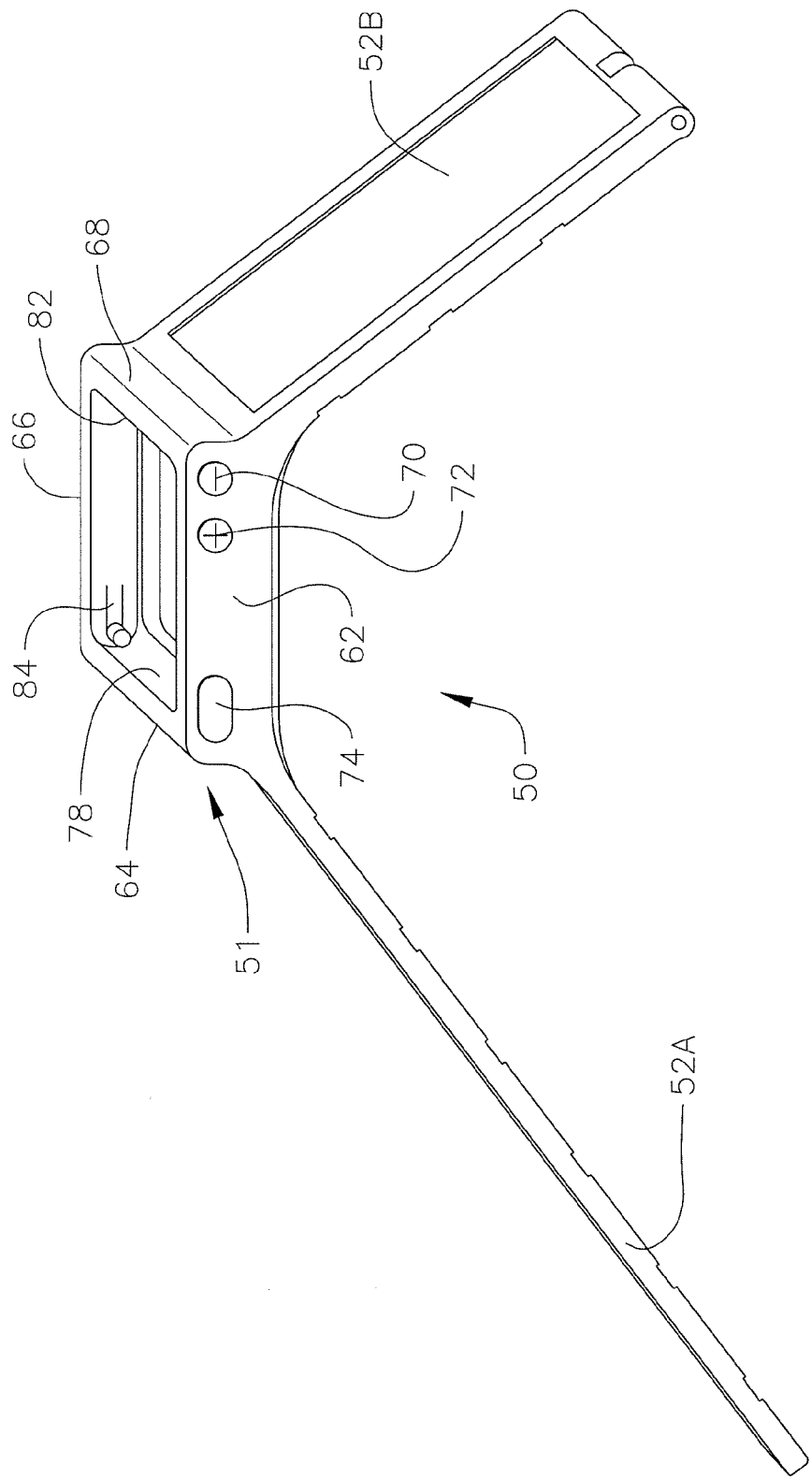

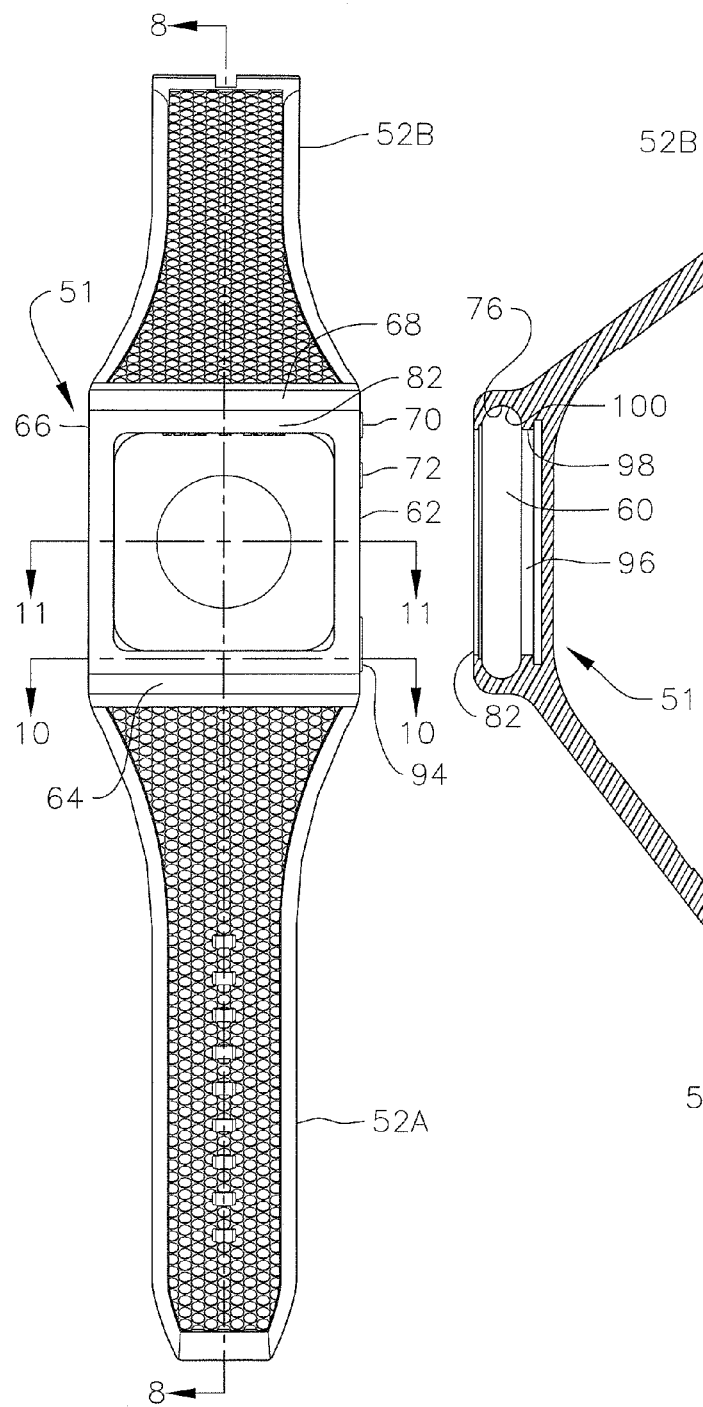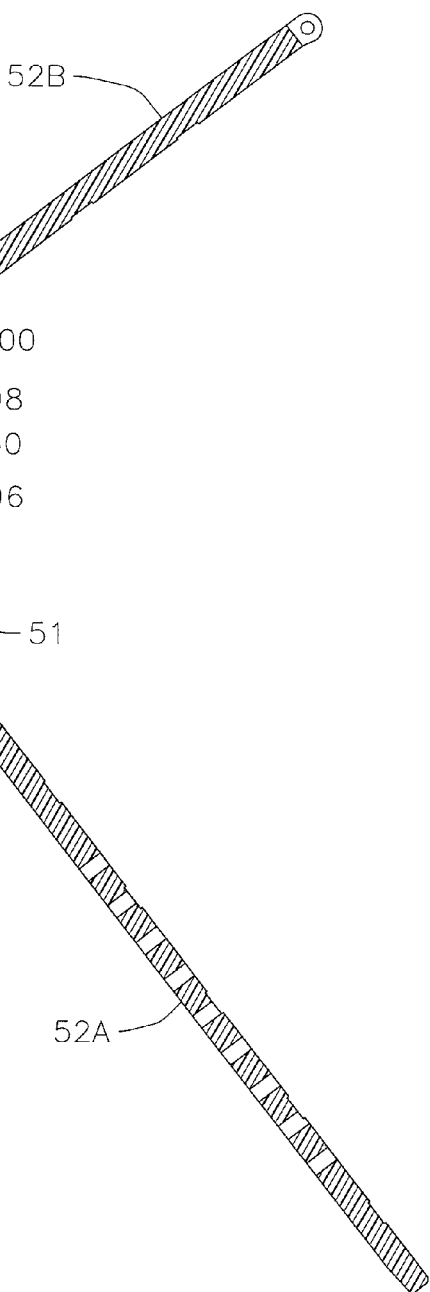

WRIST BAND FOR PORTABLE ELECTRONIC DEVICES

CROSS-REFERENCE TO RELATED APPLICATION(S)

This application claims the benefit of U.S. Provisional Application No. 61/404,333, filed Oct. 1, 2010.

BACKGROUND OF THE INVENTION

Rather than wear a wristwatch or carry some other dedicated timepiece, to tell the time some people instead rely on the clock feature of a portable electronic device, such as a cellular telephone or digital content player device. As an example of a digital content player device, Apple, Inc. offers a line of popular iPod® devices, including the new generation six iPod® Nano™, which has a high resolution 39 mm diagonal color screen, yet measures 38 mm H×41 mm W×9 mm D. The generation six iPod® Nano™ device has numerous applications, including music playback applications, a built in FM radio, and a clock function, to name a few.

Although many portable electronic devices include a clock function, it may not always be convenient for a user of these devices to access the portable electronic device to read the time. Indeed, the portable electronic device must be retrieved, e.g., from a pocket, and then held in the user's hand to be read. Moreover, with most portable electronic devices, including the Apple® iPod® Nano™ device, there are buttons and other interfaces which must be pressed in order to control the device, and situating the device where it can be viewed and controlled may at times be impractical.

BRIEF SUMMARY OF THE INVENTION

The present invention is directed to a wrist band for holding a portable electronic device, in particular, an Apple® iPod® Nano™ device, and a wrist band and portable electronic device (e.g., an Apple® iPod® Nano™) combination.

The generation 6 Apple® iPod® Nano™ is a compact compressed digital file player that measures 38 mm H×41 mm W×9 mm D and has a high resolution 39 mm diagonal color screen. It is capable of playing a variety of compressed audio file types including, AAC, Protected AAC, HE-AAC, MP3, MP3 VBR, and Audible (formats 2, 3, 4, Audible Enhanced Audio, AAX, and AAX+), Apple Lossless, AIFF, and WAV. At some point in the future, it may also be enabled to play video and other files. The Apple® iPod® Nano™ device has various access and control features. At its top edge it has two volume buttons (marked + for volume up, and – for volume down), and a sleep/wake button. At its bottom edge, there is an earphone jack plug and a dock connector. The front surface has the high resolution color display. A spring loaded clip is positioned on a back side of the device and is available to clip the device to an article of clothing, a backpack, etc.

The wrist band of the invention is designed to hold a portable electronic device, namely, an Apple® iPod® Nano™ device. The wrist band includes a band portion that is to be attached around a wearer's wrist. In an exemplary embodiment, the band portion consists of two straps and a buckle. In lieu of two straps and a buckle, a single circular band, or a portion of a circular band, or some other arrangement can be provided. The wrist band further includes a case portion with a cavity into which the portable electronic device, e.g., an Apple® iPod® Nano™ device, will fit and be retained in such a manner that it can be seen, controlled, and accessed. The cavity is sized and shaped to snuggly retain the Apple® iPod® Nano™ device in place, and preferably does so in a water resistant manner. The case portion includes button controllers that are accessible and controllable from the outside of the case portion. The button controllers are sized, placed, and designed to control corresponding buttons of the Apple® iPod® Nano™ device, namely the two volume buttons (+ for volume up, and – for volume down), and a sleep/wake button. Accordingly, when the Apple® iPod® Nano™ device is placed in the case portion of the wrist band, the device can be operated in the same manner as a free standing iPod® Nano™ device by pressing the corresponding button controllers of the case portion. The case portion also includes an earphone jack clip that is moveable between a first position and a second position. In the first position, the earphone jack clip fits in a corresponding relief in the case portion and blocks a hole which is aligned with an entrance to the earphone jack plug of the Apple® iPod® Nano™ device positioned in the case portion. This first position can correspond to the position when the Apple® iPod® Nano™ device is being used in a non-audio mode, such as when it is set in its timepiece mode or to view images, wherein a user may wish to avoid the possibility of liquid from entering the earphone plug of the device. In the second position, the earphone jack clip is removed from the relief in the case portion and the jack plug of the Apple® iPod® Nano™ device to allow a user to plug in earphones into jack plug of the Apple® iPod® Nano™ device. The button controllers (volume up and volume down and sleep/wake buttons) and the earphone jack clip are located on a perimeter rim of the case portion and aligned with like features of the Apple® iPod® Nano™ device. Besides retaining the button controllers and the earphone jack clip, the perimeter rim of the case portion is preferably flexible and resilient in order to retain the Apple® iPod® Nano™ device in the relief in the case portion and in an exemplary embodiment provide a water resistant seal therewith. The perimeter rim sidewalls preferably includes a gasket region which will overlap a front perimeter rim of the Apple® iPod® Nano™ device for the purpose of preventing the Apple® iPod® Nano™ device from inadvertently falling out of the opening in the case portion, and in an exemplary embodiment also establishes a water resistant seal with the Apple® iPod® Nano™ device. In the case portion, it is preferable that at least a portion of the perimeter rim sidewalls and the gasket region be formed of flexible and resilient material, such as plastic or rubber. The inventors have found that silicone rubber functions well. However, the case portion can be made without a perimeter rim that does not entirely encircle the edge of the Apple® iPod® Nano™ device. The perimeter rim can preferably provide sufficient compressive force and/or frictional force to retain the Apple® iPod® Nano™ device in the case portion. The cavity can include steps or other retainers, for use in retaining the Apple® iPod® Nano™ device in the case portion. The cavity includes a recess for the clip of the Apple® iPod® Nano™ device. The clip recess preferably includes a lip which will help capture and retain the clip in the clip recess and retains the iPod® Nano™ device in the case portion.

The case portion and band portion can be integrally formed together, e.g., from plastic material, or the case portion and band portion can be separate pieces. For example, when the case portion and the band are formed separately, the case can be foamed of silicone rubber and the watch band can be formed of other flexible and resilient material, such as plastic or rubber, silicone, etc., or can be formed of other less flexible materials, such as metal, leather, hard plastic, etc.

BRIEF DESCRIPTION OF THE DRAWINGS

FIG. 6 is a right side perspective view of the exemplary wrist band of FIG. 5.

FIG. 7 is a top plan view of the exemplary wrist band of FIG. 5

FIG. 8 is a cross-sectional view of the exemplary wrist band of FIG. 7 through view lines 8-8 of FIG. 7.

DETAILED DESCRIPTION

Figure 1:
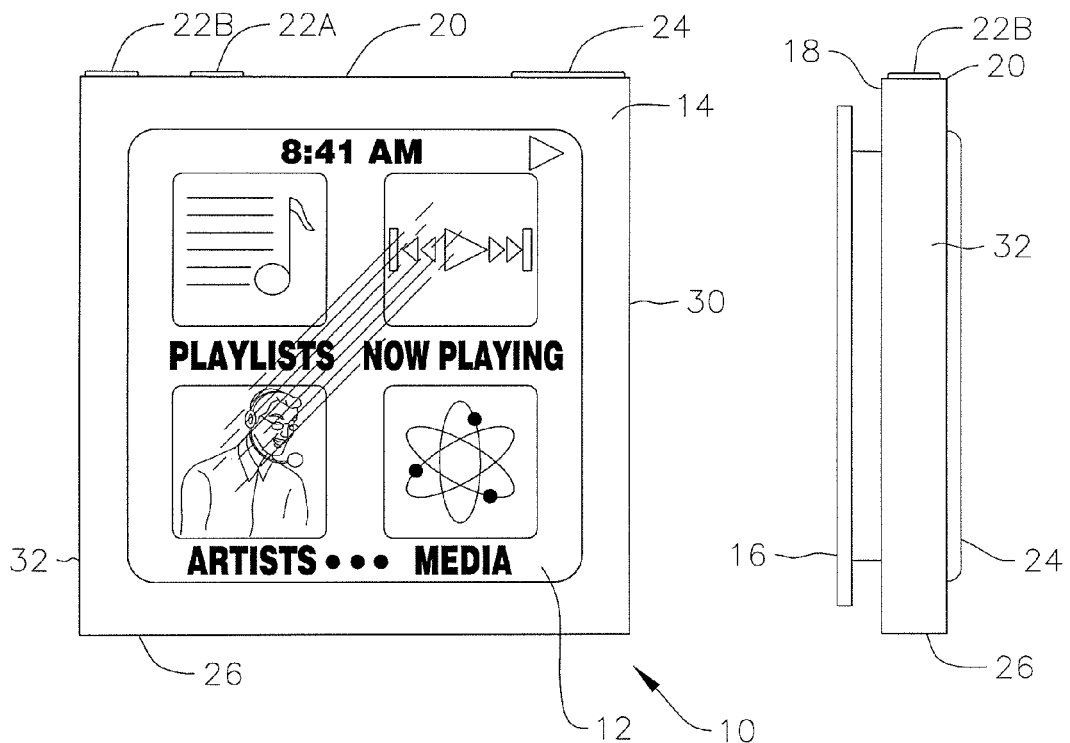
FIG. 1 is a front view of a prior art Apple® iPod® Nano™ device.
Figure 2:
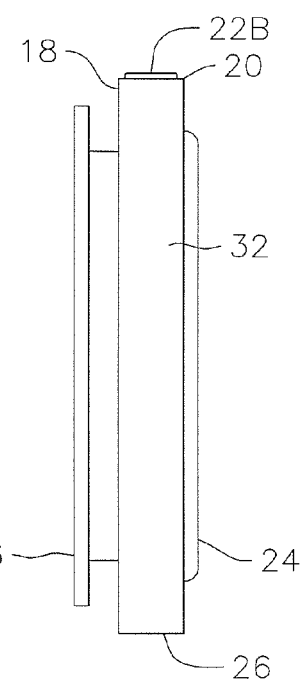
FIG. 2 is left side view of a prior art Apple® iPod® Nano™ device of FIG. 1.
Figure 3:
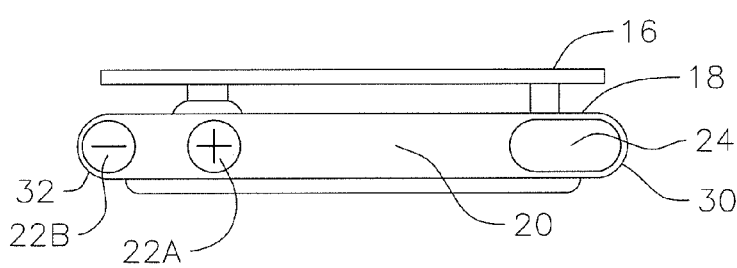
FIG. 3 is a top view of a prior art Apple® iPod® Nano™ device.
Figure 4:
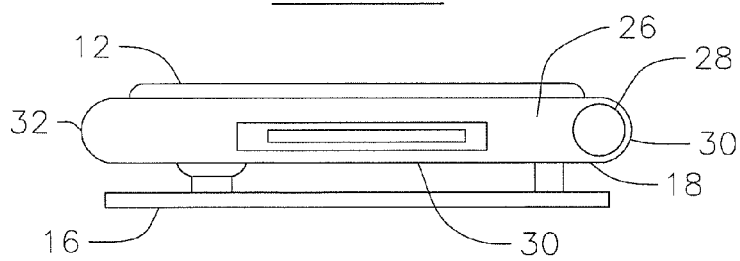
FIG. 4 is a bottom view of a prior art Apple® iPod® Nano™ device.

FIG. 1 is a front view of a prior art Apple® iPod® Nano™ portable audio player device 10. FIGS. 2-4 are a left side view, a top view, and a bottom view thereof, respectively. It measures 38 mm H×41 mm W×9 mm D and has a high resolution 39 mm diagonal color display 12 located on a front surface 14 thereof. A spring loaded clip 16 extends from a back surface 18 of the device 10. At a top edge 20 there are two volume control buttons 22A and 22B (marked "+" for volume up, and "−" for volume down), and a sleep/wake button 24. At a bottom edge 26, there is an earphone jack 28 and a dock connector 30. The earphone jack plug 28 has an opening for receiving the earphone jack (not shown.) The Apple® iPod® Nano™ portable audio player device 10 has opposite curved side 30 and 32 between the top edge 20 and the bottom edge 26.

Figure 5:
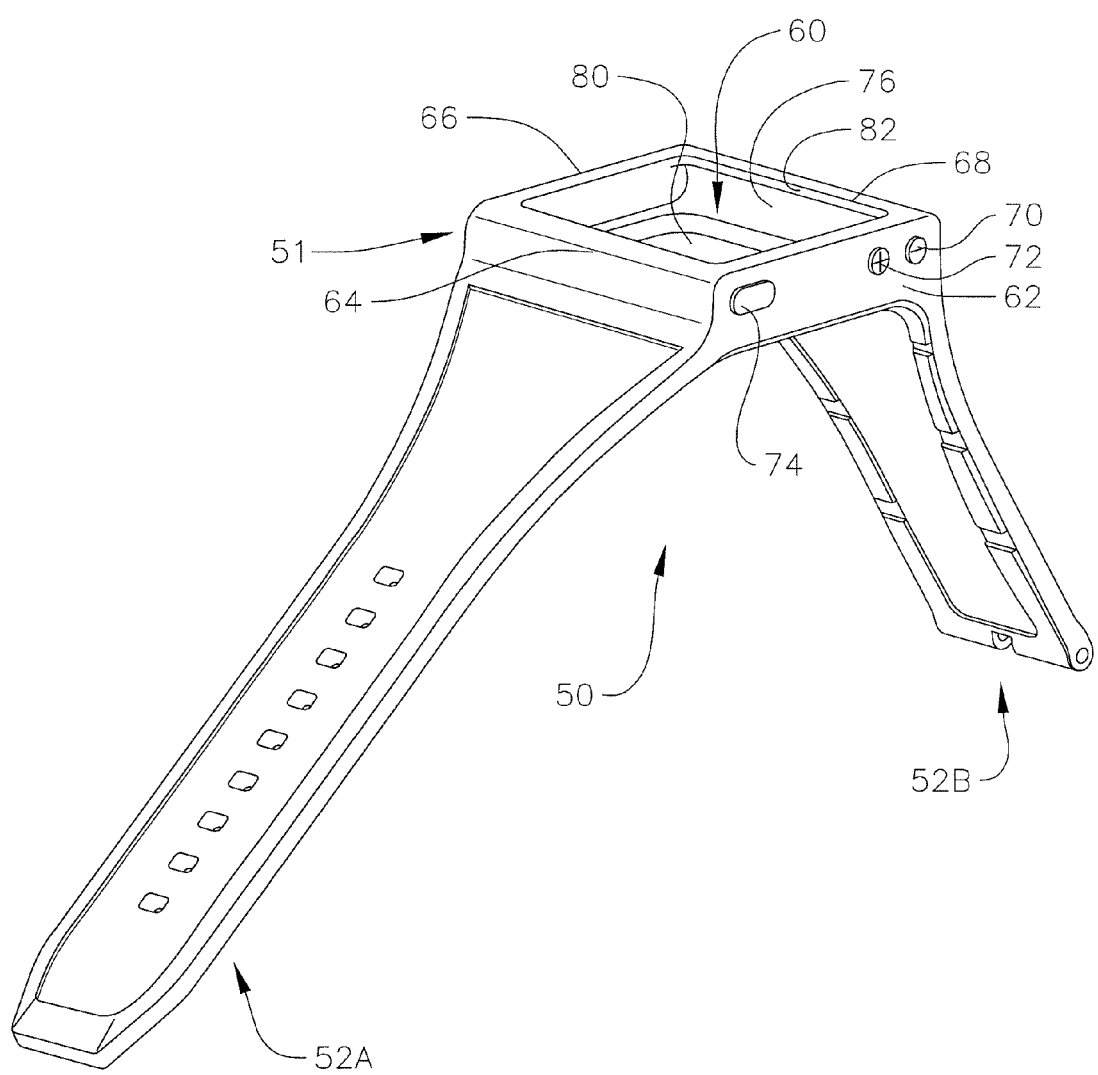
FIG. 5 is a front right side perspective view of an exemplary embodiment of a wrist band of the invention, shown without a buckle.
Figure 9:
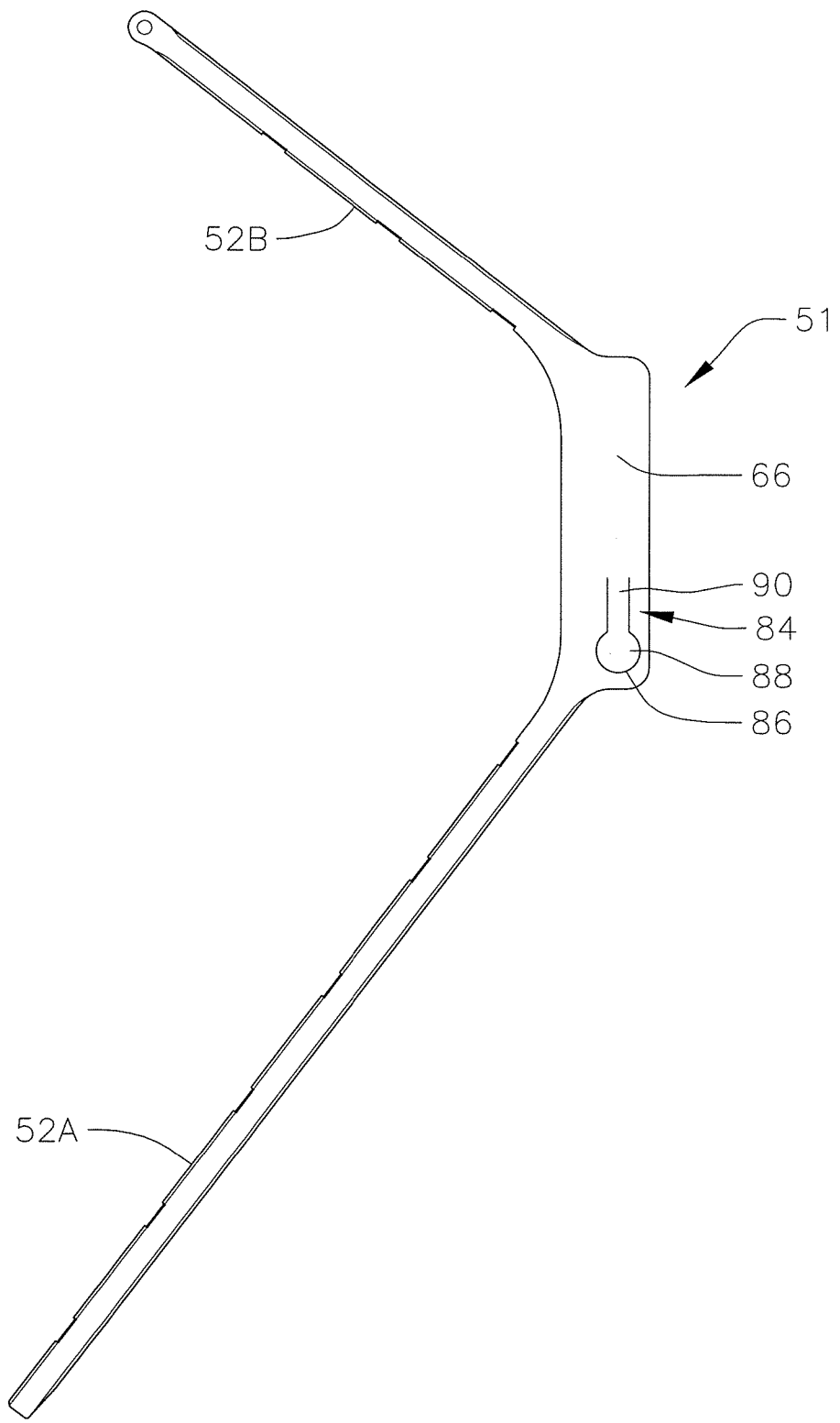
FIG. 9 is a left side view of the exemplary wrist band of FIG. 7.
Figure 10:
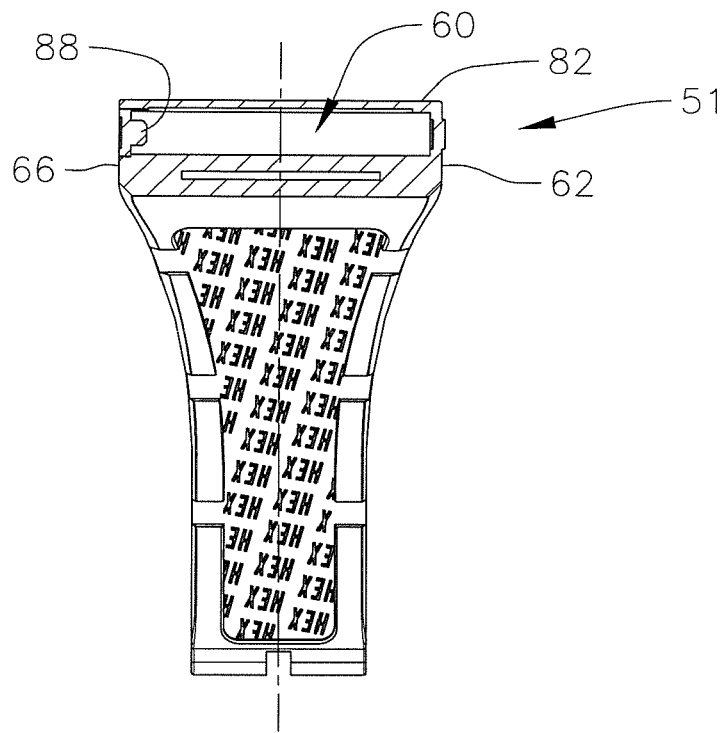
FIG. 10 is a cross-sectional view of the exemplary wrist band of FIG. 7 through view lines 10-10 of FIG. 7.

FIG. 5 is a front right side perspective view and FIG. 6 is a right side perspective view of an exemplary embodiment of a wrist band 50 of the invention. FIG. 7 is a top plan view of the exemplary wrist band 50. FIG. 8 is a cross-sectional view of the exemplary wrist band of FIG. 7 through view lines 8-8.

The wrist band 50 of the invention is designed to hold a portable electronic device, which in an exemplary embodiment comprises an Apple® iPod® Nano™ device 10. For illustration purposes the invention is described for use with an Apple® iPod® Nano™ device 10. However, it is adapted to work with other portable electronic device. The wrist band 50 includes a case portion 51 that holds the portable electronic device and a band portion that is to be attached around a wearer's wrist. In an exemplary embodiment, the band portion has of two straps 52A and 52B and a buckle 54 (shown in FIG. 12). The case portion 51 fits and retains the portable electronic device, e.g., an Apple® iPod® Nano™ device 10 in such a manner that its display screen 12 can be seen and its volume control buttons 22A and 22B and a sleep/wake button 24 can be controlled (see FIGS. 12 and 13), and its earphone jack 28 and be accessed when needed, and protected when not in use, thereby permitting full utilization and protection of the iPod® Nano™ device 10.

Figure 12:
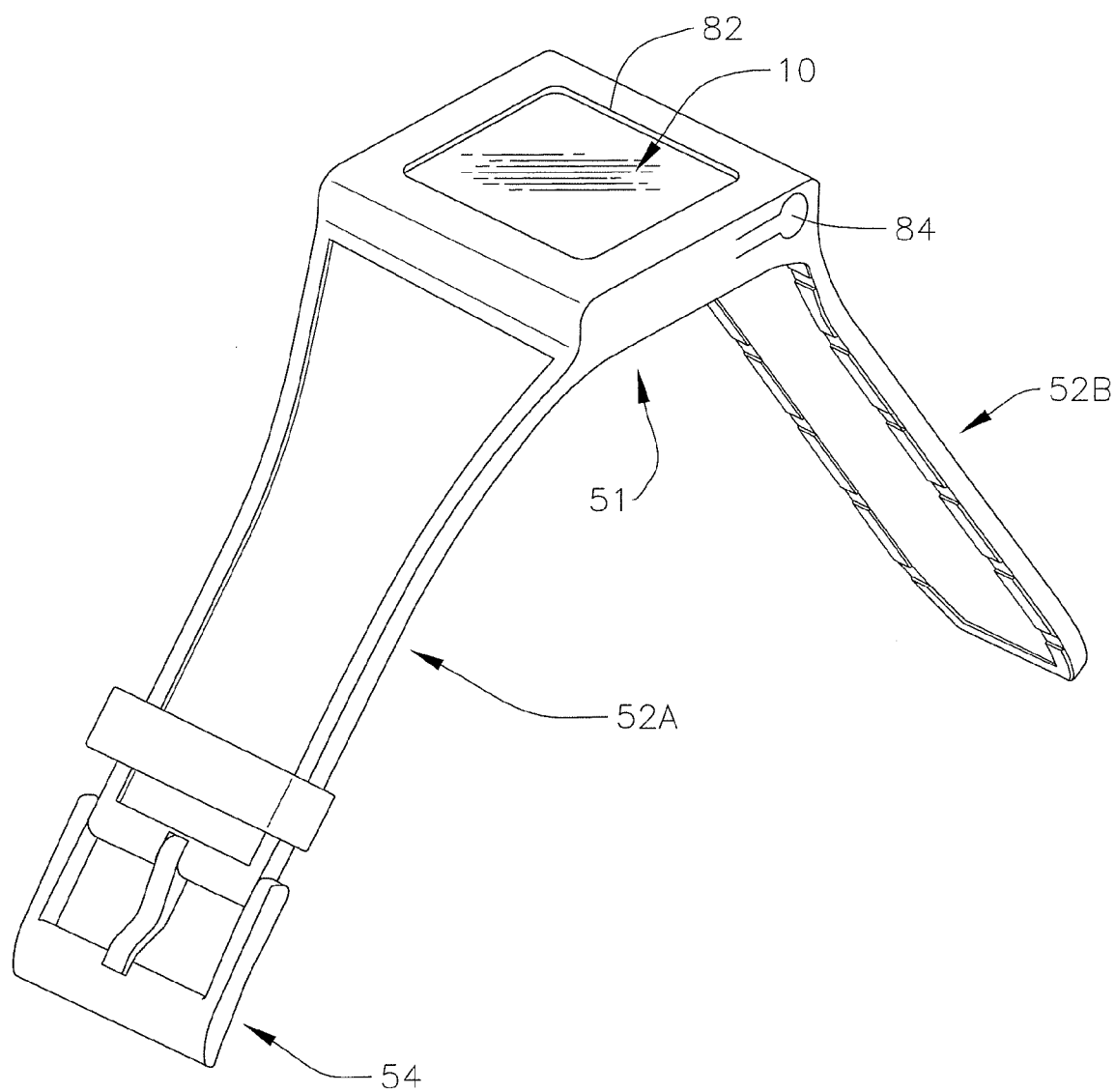
FIG. 12 is an front right side perspective view of the exemplary embodiment of a wrist band of the invention of FIG. 5, shown with a buckle and holding an Apple® iPod® Nano™ device.
Figure 13:
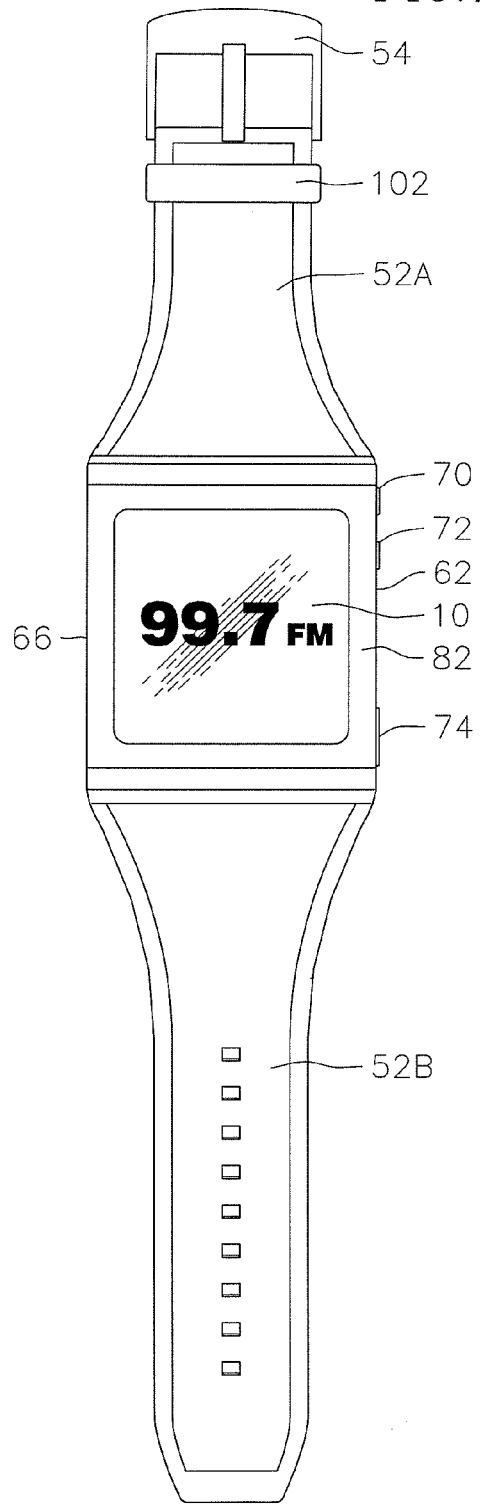
FIG. 13 is a front view of the exemplary embodiment of a wrist band of the invention of FIG. 5 shown holding an Apple® iPod® Nano™ device.
Figure 14:
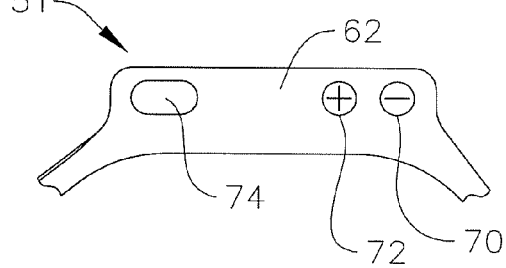
FIG. 14 is a detail right side view of the exemplary embodiment of a wrist band of FIG. 13.
Figure 15:
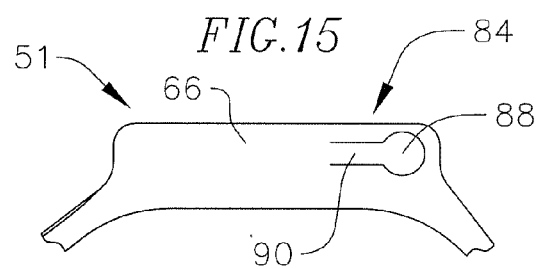
FIG. 15 is a detail left side view of the exemplary embodiment of a wrist band of FIG. 13 with its jack clip in its closed position.

Referring to FIGS. 5-11, and 14, the case portion 51 has a cavity 60 into which the Apple® iPod® Nano™ device 10 is received. The cavity 60 is sized and shaped to snuggly retain the Apple® iPod® Nano™ device 10 in place, and preferably does so in a water resistant manner. The case portion 51 has sidewalls 62, 64, 66, and 68 that extend upwardly from an inside bottom wall 80 and forms the cavity 60. The case portion 51 is preferably formed of relatively soft and pliable material, such as silicone rubber which will closely conform to the Apple® iPod® Nano™ device 10 placed therein. The side wall 62 has a down volume button controller 70, an up volume button controller 72, and a sleep/wake button controller 74 formed therein that are accessible and controllable from the outside of the case portion 51. The button controllers 70, 72, and 74 are sized, placed, and designed to control corresponding down volume button 22B, up volume button 22A, and a sleep/wake button 24, respectively, of the Apple® iPod® Nano™ device 10. The button controllers 70, 72, and 74 protrude outwardly from the side wall 62 and can be pressed with a user's finger. When pressed, the material in the area of the button controllers 70, 72, or 74 will be pushed inwardly into the cavity 60 which holds the Apple® iPod® Nano™ device 10, and will impact on the corresponding down volume button 22B, up volume button 22A, and a sleep/wake button 24, respectively, of the Apple® iPod® Nano™ device 10, and thereby allow full control of the device 10. Due to the resiliency of the material forming the case portion 51, when finger pressure on the button controllers is released, the button controllers will return to their undepressed condition and will cease to contact the control buttons of the device 10. Accordingly, when the Apple® iPod® Nano™ device 10 is placed in the cavity 60 in the case portion 51 of the wrist band 50, the Apple® iPod® Nano™ device 10 can be operated in the same manner as a freestanding Apple® iPod® Nano™ device 10 by pressing the corresponding button controllers (70, 72, and/or 74) of the case portion 51. The sidewalls 64 and 68 have concavities 76 and 78, respectively, formed therein which are sized and shaped complementary to the rounded sides 32 and 30, respectively, of the Apple® iPod® Nano™ device 10, and will ensure that the device 10 will fit tightly and securely in the cavity 60. The sidewalls 62, 64, 66, and 68 have a perimeter gasket portion 82 that extends inwardly from a top edge of sidewalls 62, 64, 66, and 68. As best shown in FIGS. 12 and 13, the perimeter gasket portion 82 will partially overlap onto the upper surface 12 of the Apple® iPod® Nano™ device 10, and thereby provide a water resistant seal therewith. The gasket portion 82 which will overlap a front perimeter edge of the Apple® iPod® Nano™ device for the purpose of preventing the Apple® iPod® Nano™ device from inadvertently falling out of the cavity 60 in the case portion and in an exemplary embodiment establishes a water resistant seal with the Apple® iPod® Nano™ device 10. In the case portion 51, it is preferable that at least the gasket portion 82 be formed of flexible and resilient material, such as soft plastic or rubber, silicone, etc. The perimeter sidewall rim can preferably provide sufficient compressive force and/or frictional force to retain the Apple® iPod® Nano™ device in the case portion.

Figure 16:
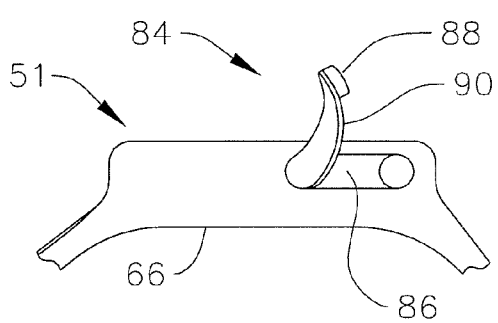
FIG. 16 is a detail left side view of the exemplary embodiment of a wrist band of FIG. 13 with its jack clip in its open position.

The case portion 52 also includes an earphone jack clip 84 that fits into a corresponding relief 86 formed in the sidewall 66. Indeed, the earphone jack clip 84 is preferably formed together with the sidewall 66 and water tightly fits therein. The earphone jack clip 84 is moveable between a first position and a second position. In the first position, as best shown in FIGS. 9-12 and 15, the earphone jack clip 84 fits in the relief 86 in the sidewall 66 of the case portion 51. The earphone jack clip 84 has a bulbous end 88 connected to a leash portion 90 which extends from the sidewall 66. The bulbous end 88 is aligned with an entrance of the earphone jack plug 28 of the Apple® iPod® Nano™ device 10 positioned in the case portion 51. Preferably, the bulbous end 88 is adapted to at least partially enter the earphone jack plug 28 to block any liquid, dust, or debris that might otherwise be able to enter same. This first position can correspond to the position when the Apple® iPod® Nano™ device 10 is being used in a non-audio mode, such as when it is set in its timepiece mode or to view images, and wherein a user may wish to avoid the possibility of anything from entering the earphone jack plug 28 of the Apple® iPod® Nano™ device 10. In the second position, which is shown in FIG. 16, the earphone jack clip 84 is removed from its relief 86 in sidewall case portion 51 to allow a user to plug earphones (not shown) into the jack plug 28 of the Apple® iPod® Nano™ device 10. When no longer needed, the jack clip 84 is snapped back in place in the relief 86.

Figure 11:
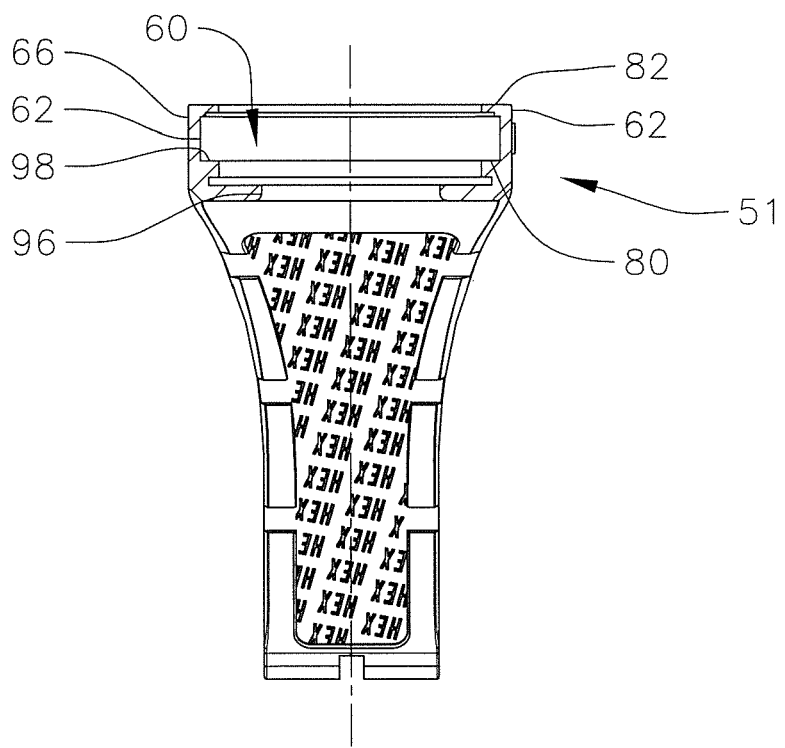
FIG. 11 is a cross-sectional view of the exemplary wrist band of FIG. 7 through view lines 11-11 of FIG. 7.

As best shown in FIGS. 8 and 11, the cavity 60 in the case portion 51 includes the inside bottom wall 80 which helps to seat the Apple® iPod® Nano™ device 10. A recess 96 is located at a lower extreme of the inside bottom wall 80. The recess 96 is sized and shaped to receive the clip 16 of the Apple® iPod® Nano™ device 10. A lip 98 that partially protrudes into the recess 96 is provided to help retain the clip 16 in place in the recess 96, and helps to further retain the Apple® iPod® Nano™ device 10 together with the case portion 51. The cavity 60 preferably has a perimeter outer rim 100 which will retain a bottom perimeter edge of the Apple® iPod® Nano™ device 10. Due to the soft and pliable nature of the material used to form the case portion 51, there is some give in the perimeter outer rim 100 of the cavity 60.

Figure 17:
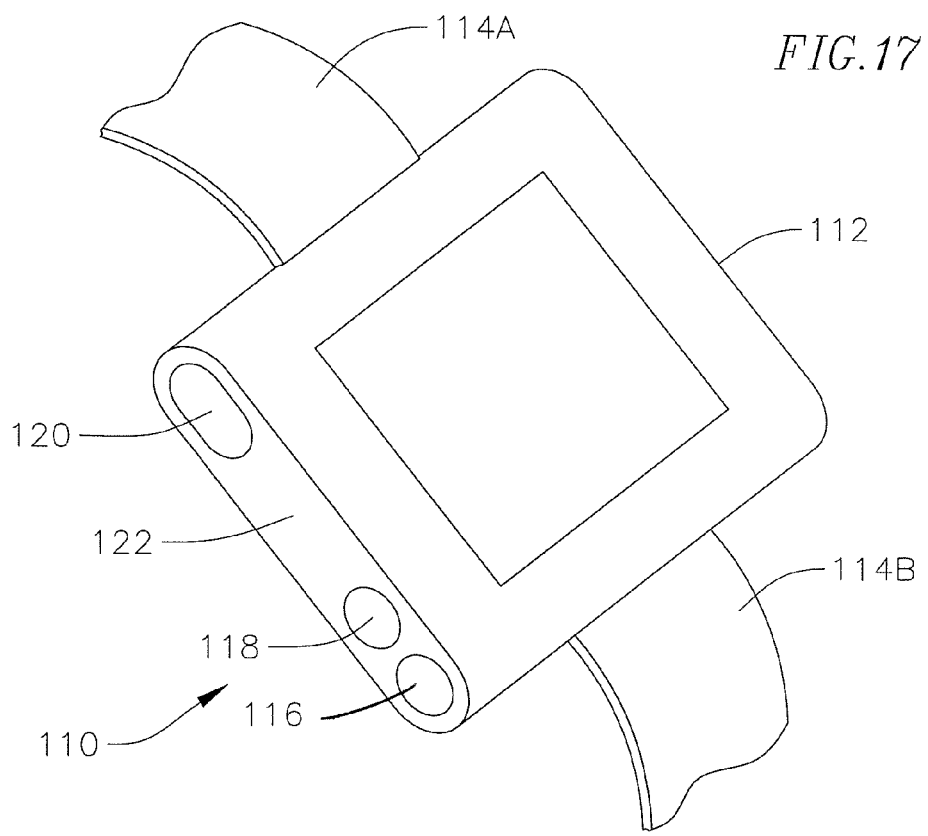
FIG. 17 is a perspective detail view of another exemplary wrist band of the invention.

FIG. 17 is a perspective detail view of another exemplary wrist band 110 of the invention. It has an enlarged case portion 112 that is attached to straps 114A and 114B. It will also include button controllers 116, 118, and 120 to control the volume down and volume up, and sleep/wake buttons, respectively, of the Apple® iPod® Nano™ device 10. It can also include a earphone jack clip as in the other embodiment of the invention.

Figure 18A:
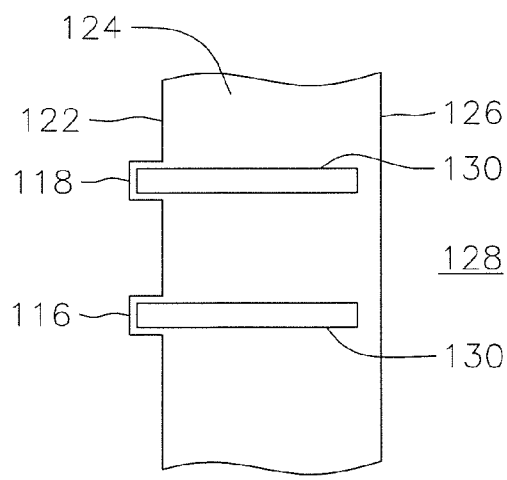
FIGS. 18A and 18B are exposed detail views showing an alternate embodiment of button controllers of the invention.
Figure 18B:
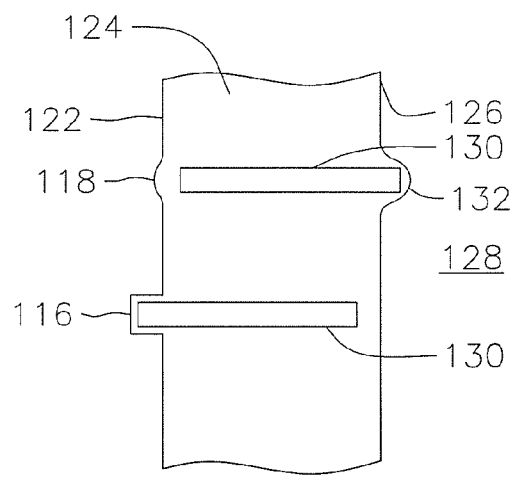

As best shown in FIGS. 18A and 18B, the button controllers 116 and 118, and 120 (as shown in FIG. 17) have protrusions which extend outwardly from the outer edge 122 of the wall 124 case portion 112. In order to ensure the effective transfer of force when the button controllers 116, 118, and 120 are pushed at an outside edge 122 of the case portion 112 to transfer the force through the wall 124 to an inside edge 126 to inside the cavity 128 for retaining the Apple® iPod® Nano™ device 10, rigid inserts 130 can be molded inside the wall 124. Thus, for example, when button controller 116 is pushed, as shown in FIG. 18B, the insert 130 will be pushed towards the inside edge 126 and the case material 132 will bulge out in front of the insert 130, and push on the corresponding control button of the Apple® iPod® Nano™ device 10 (not shown.) Once a user releases pressure on the button controller, the resiliency of the material (e.g., silicone rubber), will cause it to spring back to its pre-depressed position, shown in FIG. 18A. Thus, freed from having to provide a case portion with a very thin sidewall rim, the case portion 112 can be made in a wide different sizes and shapes.

Figure 19:
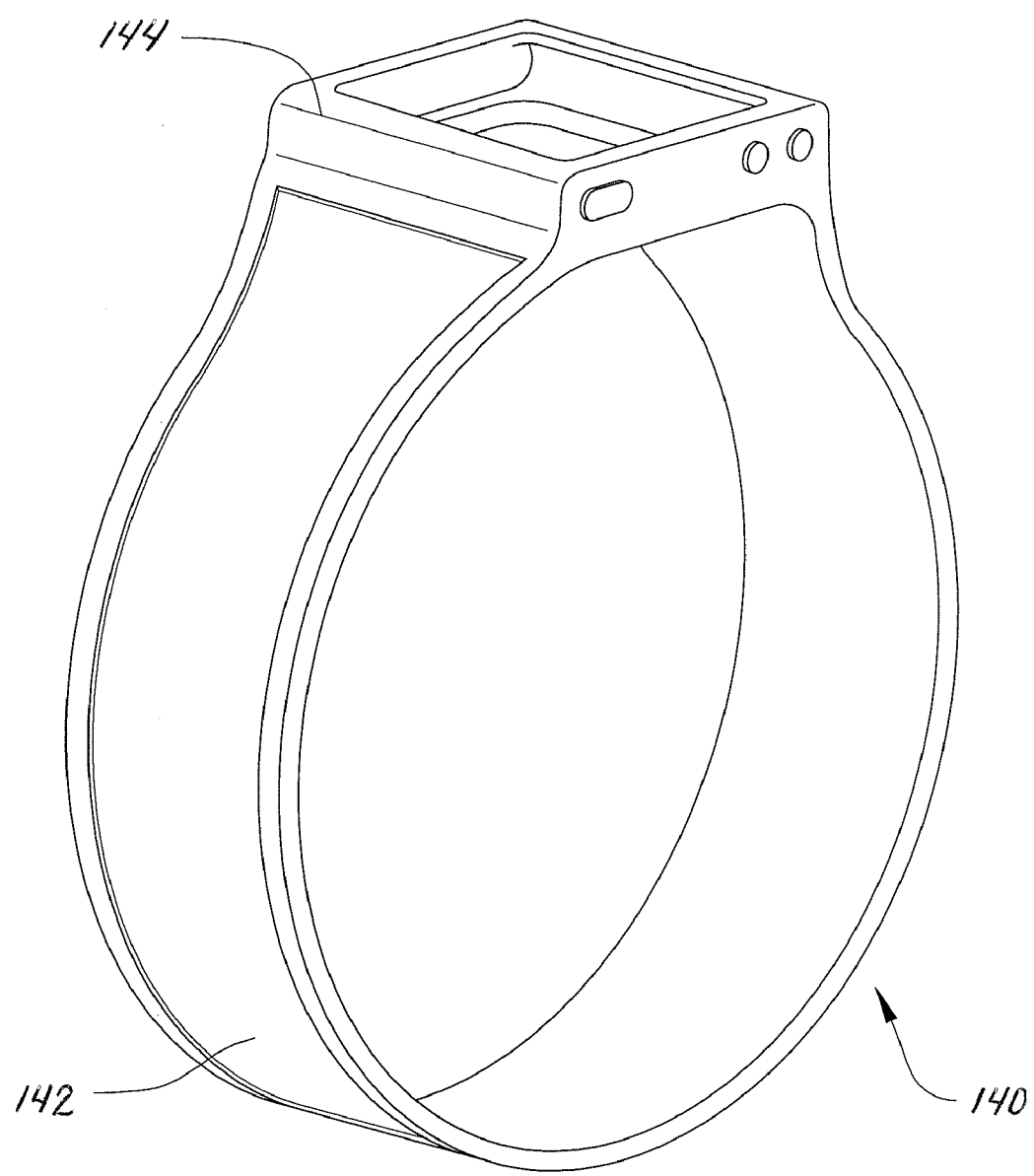
FIG. 19 is a front right side perspective view of another exemplary embodiment of a wrist band of the invention.
Figure 20:
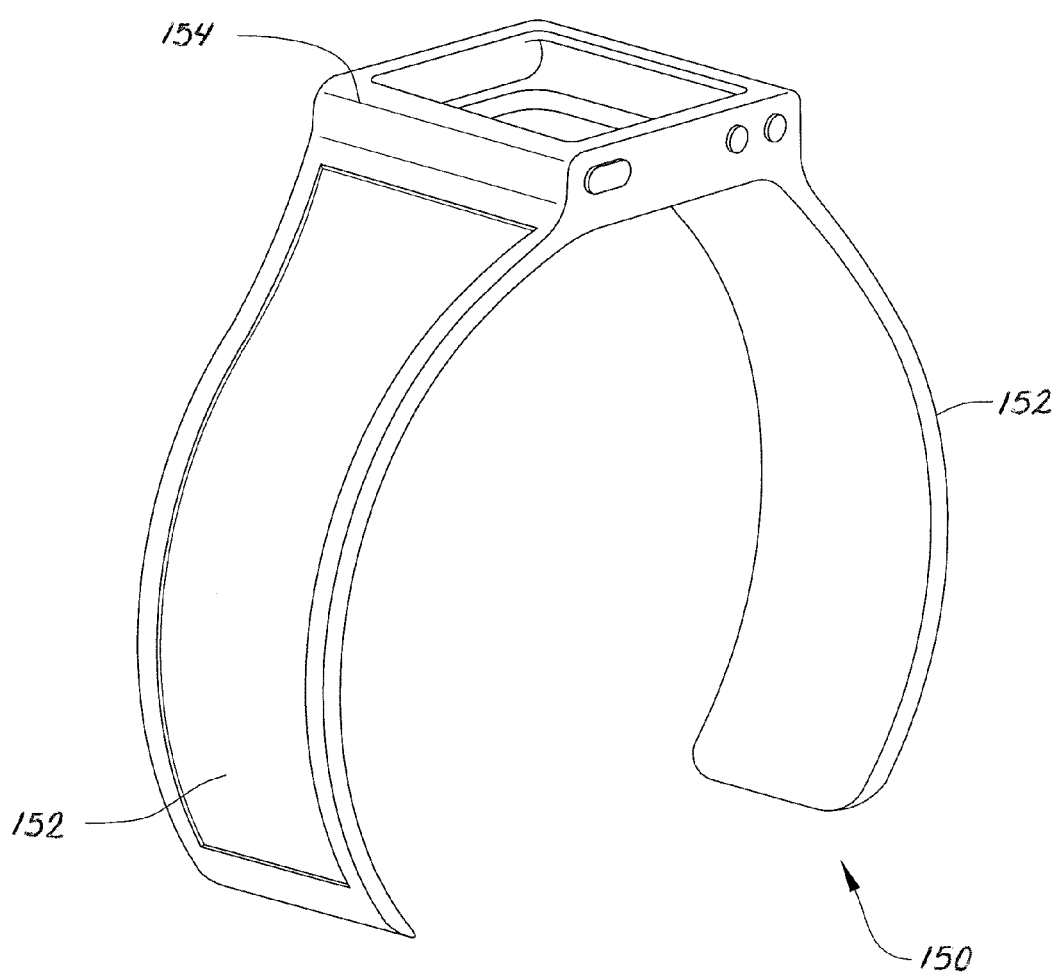
FIG. 20 is a front right side perspective view of yet another exemplary embodiment of a wrist band of the invention.

In lieu of two straps and a buckle, the invention can comprise a wrist band 140 with a single circular band 142 (e.g., with an expandable or elastic strap) and a case portion 144, as shown in FIG. 19. As shown in FIG. 20, a wrist band 150 can be configured as with a cuff style band 152 connected to a case portion 154. Other wrist band arrangements (not shown) can also be used.

Although the wrist band is described with reference to the Apple® iPod® nano device, it can be used with other electronic devices. Although preferred embodiments of the present invention have been described, it should not be construed to limit the scope of the invention. In addition, those skilled in the art will understand that various modifications may be made to the described embodiments. Moreover, to those skilled in the various arts, the invention itself herein will suggest solutions to other tasks and adaptations for other applications. It is therefore desired that the present embodiments be considered in all respects as illustrated and not restrictive.

What is claimed is:

1. A wrist band for holding a portable electronic device having a display screen and control buttons, comprising:
a band portion for engaging with a user's wrist or other body part; and
a case portion having a cavity adapted to receive the electronic device, and a perimeter rim with button controllers that are aligned with the control buttons of the electronic device.

2. The wrist band of claim 1, further comprising a gasket on the perimeter rim that provides a water resistant seal between the case portion and the portable electronic device.

3. The wrist band of claim 1, wherein the case portion further comprises an earphone jack relief and a jack clip which is detachably attachable to the case portion and adapted to fit in the earphone jack relief, wherein the jack clip is adapted to be inserted into the earphone jack relief and block a jack plug of the portable electronic device when in a first mode, and is adapted to be removed from the earphone jack relief when in a second mode.

4. The wrist band of claim 1, wherein the band portion and case portion are integrally formed together.

5. The wrist band of claim 1, wherein the button controllers are formed integrally with the case portion.

6. The wrist band of claim 1, wherein the button controllers comprises protrusions, which in an undepressed first position, extend outwardly from an outer surface of the case portion and when pushed to a second position deform inwardly into the cavity of the case portion and push on the control buttons of the portable electronic device, and once no longer pushed, will return to the undepressed first position.

7. The wrist band of claim 1, wherein the button controllers further include inserts that are formed of material more rigid than the material forming the perimeter rim, and are located on the perimeter rim.

8. The wrist band of claim 1, wherein the case portion is formed of soft and pliable material.

9. The wrist band of claim 1, wherein the cavity in the case portion is sized to snuggly receive the portable electronic device.

10. The wrist band of claim 1, wherein the portable electronic device is an Apple iPod nano device capable of displaying time.

11. The wrist band of claim 10, wherein the Apple iPod nano device has a clip on a back side thereof, and wherein the cavity comprises a recess adapted to detachably retain the clip.

12. A combination wrist band and Apple iPod nano device having display screen capable of displaying time, comprising:
 an Apple iPod nano device with a display screen and control buttons; and
 a wrist band comprising a band portion for engaging with a user's wrist, and a case portion with a cavity sized to receive and retain the Apple iPod nano device, the case portion having a perimeter rim with button controllers that are aligned with the control buttons of the Apple iPod nano device.

13. The wrist band of claim 12, further comprising a gasket on the perimeter rim that provides a water resistant seal between the case portion and the portable electronic device.

14. The wrist band of claim 12, wherein the case portion further comprises an earphone jack relief and a jack clip which is detachably attachable to the case portion and adapted to fit in the earphone jack relief, wherein the jack clip is adapted to be inserted into the earphone jack relief and block a jack plug of the Apple iPod nano when in a first mode, and is adapted to be removed from the earphone jack relief when in a second mode.

15. The wrist band of claim 12, wherein the band portion and case portion are integrally formed together.

16. The wrist band of claim 12, wherein the button controllers are formed integrally with the case portion.

17. The wrist band of claim 12, wherein the button controllers comprises protrusions, which in an undepressed first position, extend outwardly from an outer surface of the case portion and when pushed to a second position, deform inwardly into the cavity of the case portion and push on the control buttons of the Apple iPod nano, and once no longer pushed, will return to the undepressed first position.

18. The wrist band of claim 12, wherein the button controller further include inserts that are formed of material more rigid than the material forming the perimeter rim, and are located in the perimeter rim.

19. The wrist band of claim 12, wherein the case portion is formed of soft and pliable material.

20. The wrist band of claim 12, wherein the cavity in the case portion snuggly receives the Apple iPod nano.

21. The wrist band of claim 12, wherein the Apple iPod nano device has a clip on a back side thereof, and wherein the cavity comprises a recess adapted to detachably retain the clip.

* * * * *

UNITED STATES PATENT AND TRADEMARK OFFICE
CERTIFICATE OF CORRECTION

PATENT NO. : 8,345,412 B2
APPLICATION NO. : 12/945802
DATED : January 1, 2013
INVENTOR(S) : Daniel J. Maravilla et al.

Page 1 of 1

It is certified that error appears in the above-identified patent and that said Letters Patent is hereby corrected as shown below:

In the Claims

Column 6, Claim 6, line 61     Delete "comprises"
                               Insert -- comprise --

Column 8, Claim 17, line 12    Delete "comprises"
                               Insert -- comprise --

Signed and Sealed this
Twenty-fifth Day of February, 2014

Michelle K. Lee
*Deputy Director of the United States Patent and Trademark Office*